UNITED STATES PATENT OFFICE.

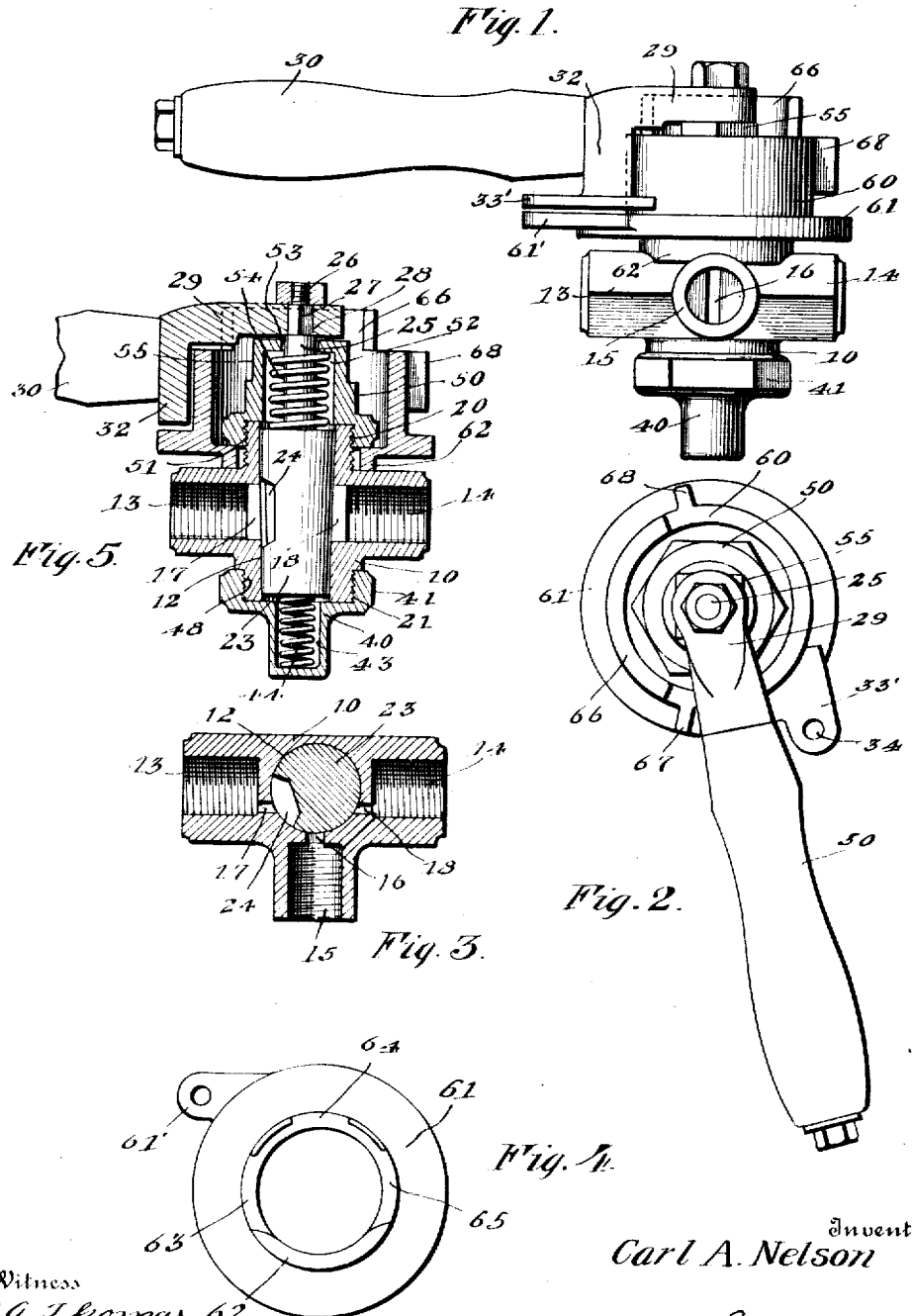

CARL A. NELSON, OF MOLINE, ILLINOIS.

VALVE FOR AIR-BRAKES.

1,338,190.   Specification of Letters Patent.   Patented Apr. 27, 1920.

Application filed February 21, 1919. Serial No. 278,545.

*To all whom it may concern:*

Be it known that I, CARL A. NELSON, citizen of the United States, residing at Moline, in the county of Rock Island and State of Illinois, have invented new and useful Improvements in Valves for Air-Brakes, of which the following is a specification.

This invention relates to a controlling valve for an air brake, and the invention consists in certain novel construction hereinafter described and claimed, and relating more particularly to the valve casing and the ports thereof, the valve member proper, and the means for limiting the degree of movement of the valve member.

The object is to provide a construction more effective than those heretofore employed for the purpose indicated.

In the drawings,

Figure 1 is a view of the device in elevation,

Fig. 2 is a top plan view,

Fig. 3 is a transverse section through the valve chamber and plug,

Fig. 4 is a bottom plan view of a flanged member cut away to fit the pipe connections of the casing, in the manner shown in Fig. 1, Fig. 5 is a view of the complete construction, in vertical section.

The valve casing is designated 10, and is provided with a tapering bore 12, the casing having pipe connections 13 and 14 oppositely located, and a pipe connection 15. The connection last named has communication with the bore by means of port 16 and ports 17 and 18 communicating with the oppositely located pipe connections. The upper portion of the casing is threaded as shown at 20 and the lower portion is also threaded as shown at 21, providing for the accommodation of the caps referred to below.

The valve member proper or valve plug is designated 23 and is provided with a port or cut-away portion 24, whereby the ports, or certain of them, are placed in communication, in the operation of the valve. The valve body is tapered to correspond with the taper of the bore. A stem 25 is connected with the valve body and is threaded at its upper portion as shown at 26, and is provided with a squared portion 27, which enters a squared socket 28 in the member 29, attached to the operating member or handle 30. This member 29 is provided with a right-angled and downwardly extending portion 32 having an offset 33' extending laterally and provided with an aperture 34.

A cap 40 is provided with a hexagonal portion 41 on the exterior thereof, and is further provided with a bore 43, for the accommodation of a coiled spring, or one end of that spring, this element being designated 44 and bearing against the lower end of the valve plug, or if preferred bearing against a washer below the valve plug. The cap is internally threaded at 48 and is connected with the lower threaded end of the valve casing.

A cap 50 is internally threaded as shown at 51 and has threaded connection with the upper end of the valve casing. This cap has an internal bore 52 which is reduced at 53, the bore receiving the coiled spring 54 bearing against the upper end of the valve member. The opposite end of the coiled spring 54 bears against the flange formed incidentally to the reduced end portion of the bore. The cap 50 is further provided with a squared portion 55, by means of which the cap is screwed home. It will be observed that the valve is positioned between upper and lower coiled springs, whereby the valve is resiliently seated and is maintained at all times in correct position to prevent leakage, one of the springs (the upper spring) being stronger than the lower one.

A flanged tubular member is designated 60, the flange thereof being shown at 61, and having a boss 62 extending from its lower side, this boss being cut away in three places as shown at 63, 64 and 65, each of these cut away portions accommodating one of the pipe connections before referred to. This construction permits of the prompt assembling of the parts in exactly correct position.

The tubular flanged element 60 is provided with a segmental portion 66 and with laterally extending stops 67 and 68, with which elements last named the *right angled* portion 32 coöperates in limiting the movement of the handle 30 and therefore of the valve plug, thus causing the port of the plug to register with the required ports of the casing. The flanged portion 61 is provided with an offset 61' having an aperture therein adapted to register with the aperture 34 before mentioned, permitting of the insertion of a retaining device. The laterally extending portion 33' passes under the stop 68 when the handle is thrown to the extreme right, permitting engagement between the elements 32 and 68, for limiting the movement of the valve member in that direction.

It will therefore be observed that there is a particular relation between the ports of the casing, the port or cut away portion of the valve member, and the cut away portions of the boss on the member 60, and more especially the flanged portion 61 thereof. It is needless to add that the stops 67 and 68 also coöperate with the elements referred to.

The upper cap engages the upper surface of the central portion of the tubular flanged element 60 and retains the latter in position, for effecting the purpose specified.

What is claimed is—

In a device of the class described, a casing provided with ports, pipe connections oppositely located and communicating with certain of the ports, an additional pipe connection communicating with the remaining port, a valve member within the casing, a tubular member having an opening receiving the upper end of the casing, said member having a boss thereon cut away to accommodate the pipe connections, stops on said tubular member, a handle operating between the stops and connected with the valve member, securing means for the tubular member, the cut away portions determining the position of the stops with reference to the ports of the casing and the position of the valve port when either of the stops is engaged.

In testimony whereof I affix my signature.

CARL A. NELSON.